United States Patent
Zhao et al.

(10) Patent No.: US 10,562,482 B2
(45) Date of Patent: Feb. 18, 2020

(54) VEHICLE AIRBAG

(71) Applicant: Ford Global Technologies, LLC, Dearborn, MI (US)

(72) Inventors: Yuqin Zhao, Troy, MI (US); Mangesh Kadam, Canton, MI (US); Leonard Anthony Shaner, New Baltimore, MI (US); Srinivas Reddy Malapati, Novi, MI (US); Matt Alan Niesluchowski, Clarkston, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 80 days.

(21) Appl. No.: 15/902,134

(22) Filed: Feb. 22, 2018

(65) Prior Publication Data

US 2019/0256036 A1 Aug. 22, 2019

(51) Int. Cl.
*B60R 21/206* (2011.01)
*B60R 21/2338* (2011.01)
*B60R 21/231* (2011.01)

(52) U.S. Cl.
CPC ........ *B60R 21/2338* (2013.01); *B60R 21/206* (2013.01); *B60R 2021/23169* (2013.01); *B60R 2021/23382* (2013.01)

(58) Field of Classification Search
CPC ................ B60R 21/203; B60R 21/206; B60R 2021/23169
See application file for complete search history.

(56) References Cited

U.S. PATENT DOCUMENTS

| | | | |
|---|---|---|---|
| 5,324,070 A | 6/1994 | Kitagawa et al. | |
| 7,661,700 B2 | 2/2010 | Imamura et al. | |
| 7,896,386 B2* | 3/2011 | Fukawatase | B60R 21/206 280/730.1 |
| 7,938,441 B2* | 5/2011 | Fukawatase | B60R 21/206 280/728.3 |
| 8,590,928 B2* | 11/2013 | Spahn | B60R 21/23 280/729 |
| 9,180,835 B2* | 11/2015 | Fukawatase | B60R 21/231 |
| 9,272,681 B1 | 3/2016 | Enders | |
| 9,499,118 B2 | 11/2016 | Jindal et al. | |
| 9,580,040 B2* | 2/2017 | Komatsu | B60R 21/233 |
| 9,902,359 B2* | 2/2018 | Takeshita | B60R 21/203 |
| 2008/0106080 A1* | 5/2008 | Fukawatase | B60R 21/231 280/730.1 |
| 2010/0164212 A1* | 7/2010 | Nakayama | B60R 21/206 280/743.2 |
| 2019/0054883 A1* | 2/2019 | Kitagawa | B60R 21/206 |

FOREIGN PATENT DOCUMENTS

JP 4336250 B2 9/2009

* cited by examiner

*Primary Examiner* — Faye M Fleming
(74) *Attorney, Agent, or Firm* — Frank A. MacKenzie; Bejin Bieneman PLC

(57) ABSTRACT

An assembly includes an airbag inflatable to an inflated position. The airbag in the inflated position has a first portion, a second portion extending transversely from the first portion, and a corner therebetween. The airbag includes a stay fixed to and rigid relative to the airbag, the stay having a bendable portion at the corner and extending from the bendable portion along the first portion and the second portion when the airbag is in the inflated position.

20 Claims, 6 Drawing Sheets

VEHICLE AIRBAG

BACKGROUND

A vehicle may include one or more airbags deployable during vehicle impacts to absorb energy from occupants of the vehicle during the impact. The airbag may be a component of an airbag assembly including a housing supporting the airbag, and an inflation device in communication with the airbag for inflating the airbag from an uninflated position to an inflated position.

DETAILED DESCRIPTION

Figure 1:
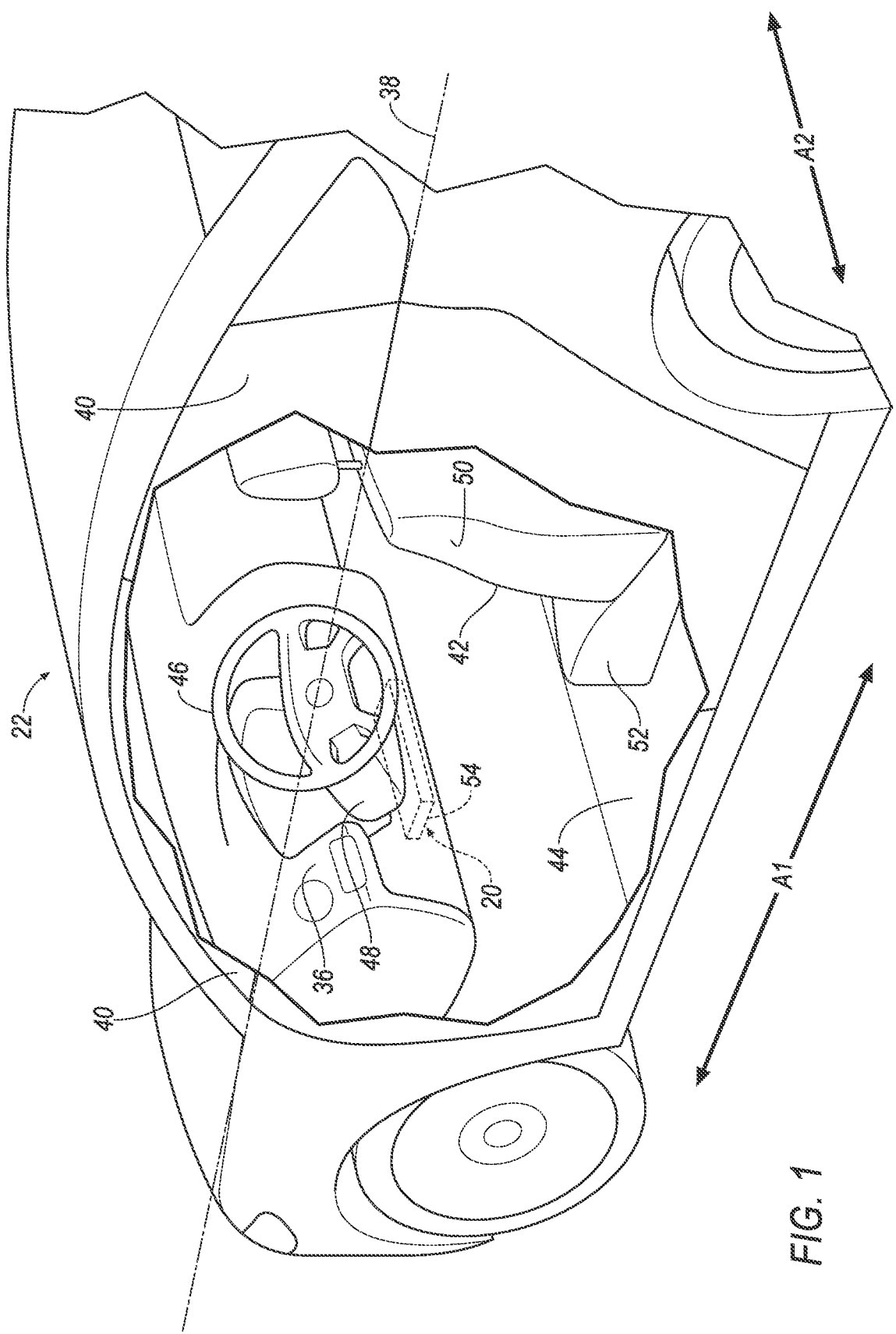
FIG. 1 is a perspective view of a vehicle with an airbag in an uninflated position.

An assembly includes an airbag inflatable to an inflated position. The airbag in the inflated position has a first portion, a second portion extending transversely from the first portion, and a corner therebetween. The airbag includes a stay fixed to and rigid relative to the airbag, the stay having a bendable portion at the corner and extending from the bendable portion along the first portion and the second portion when the airbag is in the inflated position.

The airbag in the inflated position may include a front panel and a rear panel spaced from the front panel, the stay supported by the front panel.

The stay may be bendable about the bendable portion from an extended position to a bent position when the airbag inflates to the inflated position.

The stay may be notched at the bendable portion.

The stay may include a first portion and a second portion, and the bendable portion is between the first and second portion of the stay, the bendable portion being flexible relative to the first and second portions of the stay.

The stay may be plastic.

The airbag may include a third portion extending transversely from the first portion of the airbag and a second corner therebetween, and the airbag may include a second stay fixed to and rigid relative to the airbag, the second stay having a bendable portion at the second corner and extending from the bendable portion along the first portion and third portion of the airbag in the inflated position.

The assembly may include a second stay spaced from the stay and supported by the airbag at the corner.

The assembly may include a tether, the airbag in the inflated position may define a chamber and the tether may be in the chamber.

The assembly may include a tether, the airbag in the inflated position may include a front panel and a rear panel spaced from the front panel, the tether may be fixed to the front panel at the corner and extend to the rear panel.

The airbag may be a first material, and the stay may be a second material that is different than the first material.

The first portion of the airbag may have a first length, and the second portion of the airbag may have a second length that is less than the first length.

A vehicle includes a seat. The vehicle includes an airbag positioned in front of the seat and inflatable to an inflated position. The airbag in the inflated position has a first portion, a second portion extending transversely from the first portion, and a corner therebetween. The vehicle includes a stay fixed to and rigid relative to the airbag, the stay having a bendable portion at the corner and extending from the bendable portion along the first portion and the second portion when the airbag is in the inflated position.

The vehicle may include an instrument panel and a floor, the airbag in the inflated position may be between the instrument panel and the floor.

The instrument panel may include a steering column, and the airbag in the inflated position may be between the steering column and the floor.

The first portion of the airbag may extend along a cross-vehicle axis and the second portion of the airbag may extend along a vehicle-longitudinal axis in the inflated position.

The stay may be designed to move from an extended position to a bent position upon contact from an occupant of the vehicle.

The airbag in the inflated position may be below a beltline.

The vehicle may include a tether, the airbag in the inflated position may define a chamber and the tether may be in the chamber.

The vehicle may include a tether, the airbag in the inflated position may include a front panel and a rear panel spaced from the front panel, the tether fixed to the front panel at the corner and extending to the rear panel.

With reference to the Figures, wherein like numerals indicate like parts throughout the several views, an airbag assembly 20 for a vehicle 22 includes an airbag 24 inflatable from an uninflated position to an inflated position. The airbag 24 in the inflated position has a first portion 26, a second portion 28 extending transversely from the first portion 26, and a first corner 30 between the first portion 26 and the second portion 28. The airbag assembly 20 includes a stay 32 fixed to and rigid relative to the airbag 24. The stay 32 has a bendable portion 34 at the first corner 30 and extends from the bendable portion 34 along the first portion 26 and the second portion 28 in the inflated position.

The airbag 24 in the inflated position may absorb energy from legs, in particular knees, of an occupant of the vehicle 22 during vehicle impact. The first portion 26 may absorb energy along a vehicle-longitudinal axis A1, and the second portion 28 may absorb energy along a cross-vehicle axis A2. To put it another way, the first corner 30 between the first portion 26 and the second portion 28 may catch the knee of an occupant traveling along the vehicle-longitudinal axis A1 and the cross-vehicle axis A2. The stay 32 aids in providing the first corner 30, for example, the stay 32 may provide additional stiffness to the first portion 26 and the second portion 28 proximate the first corner 30.

Figure 2:
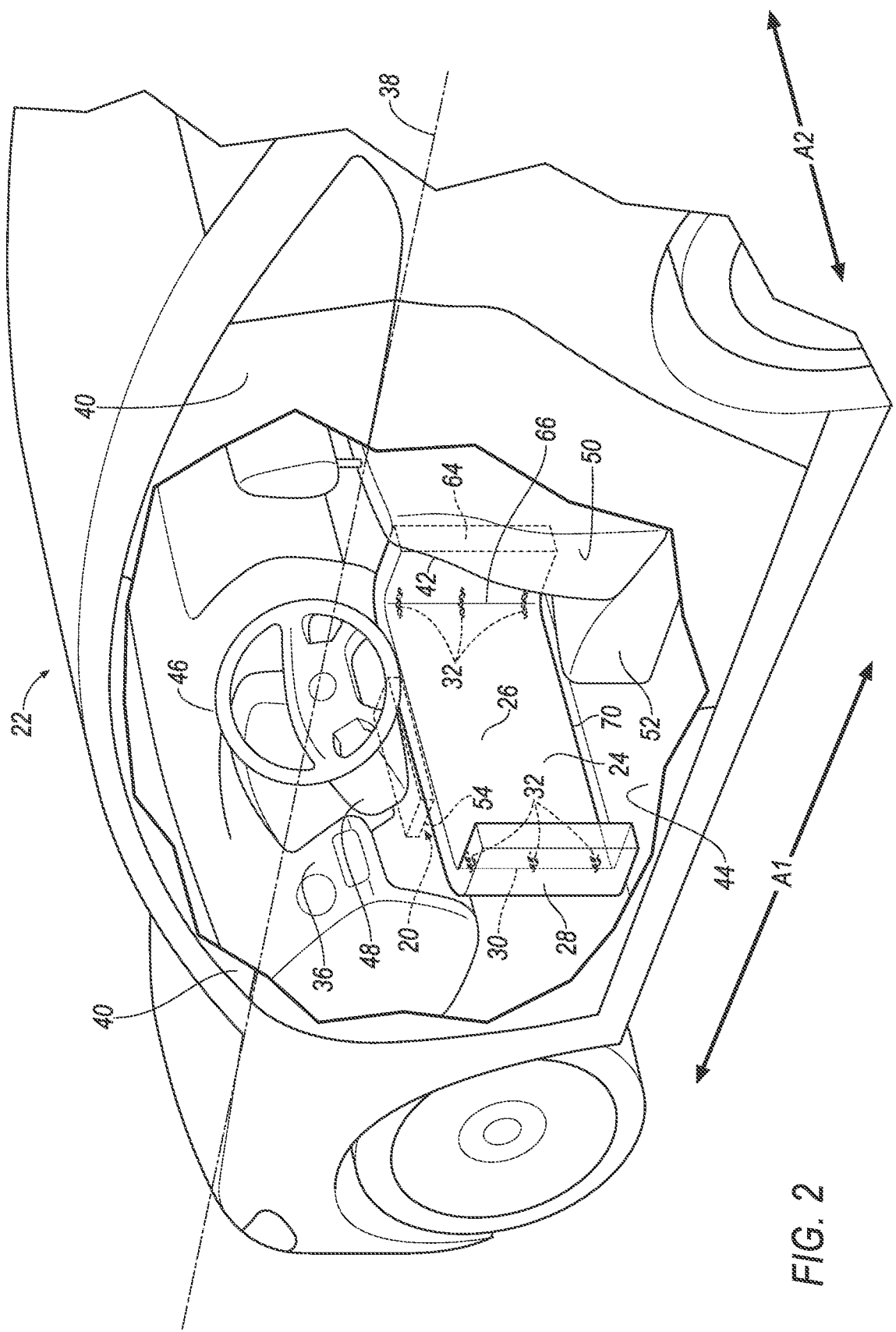
FIG. 2 is a perspective view of the vehicle with the airbag in an inflated position.
Figure 7:
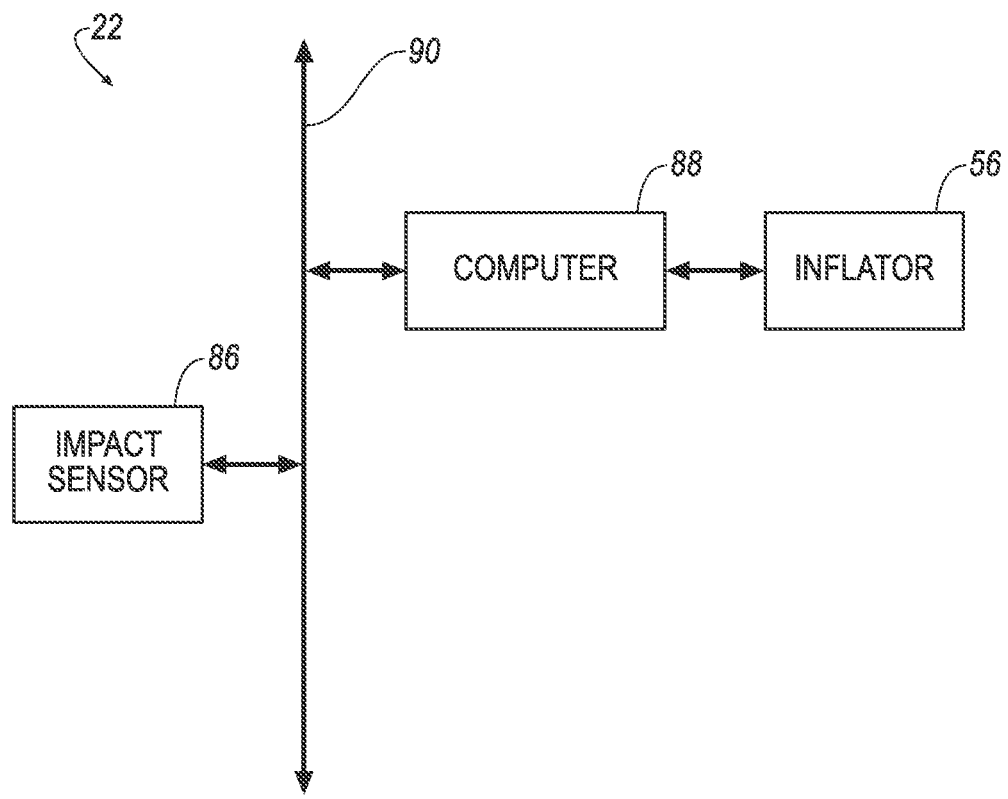
FIG. 7 is a schematic of components of the vehicle.

The vehicle 22, shown in FIGS. 1, 2, and 7, may be any passenger or commercial automobile such as a car, a truck, a sport utility vehicle, a crossover vehicle, a van, a minivan, a taxi, a bus, etc.

The vehicle 22 defines the vehicle-longitudinal axis A1, i.e., extending between a front and a rear of the vehicle 22. The vehicle 22 defines the cross-vehicle axis A2, i.e., extending between a left side and a right side of the vehicle 22. The vehicle-longitudinal axis A1 and the cross-vehicle axis A2 may be perpendicular to each other. The front, rear, left side, and right side may be relative to an orientation of an operator of the vehicle 22. The front, rear, left side, and right side may be relative to an orientation of controls for operating the vehicle 22, e.g., an instrument panel 36, etc. The front, rear, left side, and right side may be relative to a forward driving direction when wheels of the vehicle 22 are all parallel with each other, etc.

The vehicle 22 may define a beltline 38, shown in FIGS. 1 and 2. The beltline 38 extends along the vehicle-longitudinal axis A1. For example, the vehicle 22 may include one or more windows 40, and the beltline 38 may extend along a bottom edge of one or more of the windows 40.

The vehicle 22 may include a seat 42. The seat 42, shown in FIGS. 1 and 2, is a bucket seat, but alternatively the seat 42 may be a bench seat or another type of seat 42. The seat 42 may be supported by a floor 44 of the vehicle 22.

The seat 42 may include a seat back 50, a seat bottom 52, and a headrest. The headrest may be supported by the seat back 50 and may be stationary or movable relative to the seat back 50. The seat back 50 may be supported by the seat bottom 52 and may be stationary or movable relative to the seat bottom 52. The seat back 50, the seat bottom 52, and/or the headrest may be adjustable in multiple degrees of freedom. Specifically, the seat back 50, the seat bottom 52, and/or the headrest may themselves be adjustable, in other words, adjustable components within the seat back 50, the seat bottom 52, and/or the headrest, and/or may be adjustable relative to each other.

The vehicle 22 may include the instrument panel 36, shown in FIGS. 1 and 2. The instrument panel 36 may be disposed at a forward end of a passenger cabin and face toward the seat 42. The instrument panel 36 may include vehicle controls, including a steering wheel 46. The steering wheel 46 allows an operator to steer the vehicle 22 by transmitting rotation of the steering wheel 46 to movement of a steering rack. The instrument panel 36 includes a steering column 48. The steering column 48 transfers rotation of the steering wheel 46 to movement of the steering rack. The steering column 48 may be, e.g., a shaft connecting the steering wheel 46 to the steering rack.

The airbag assembly 20 may include a housing 54, an inflator 56, and the airbag 24. The inflator 56 and the airbag 24 may be disposed in the housing 54 in the uninflated position, shown in FIG. 1. The housing 54 provides a reaction surface for the airbag 24 in the inflated position, shown in FIGS. 2-4. The housing 54 may be supported by the instrument panel 36 or at any other suitable location of the vehicle 22. The housing 54 may be formed of any material, e.g., a rigid polymer, a metal, a composite, etc.

The airbag 24 may be formed of a woven polymer or any other material. As one example, the airbag 24 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The airbag 24 in the inflated position may be positioned to protect knees of an occupant of the vehicle 22. For example, the airbag 24 in the inflated position is positioned in front of the seat 42. To put it another way, the seat bottom 52 may be between the seat back 50 and the airbag 24 in the inflated position. As another example, the airbag 24 in the inflated position may be between the instrument panel 36 and the floor 44. Specifically, the airbag 24 in the inflated position may be between the steering column 48 and the floor 44. As another example, the airbag 24 in the inflated position may be below the beltline 38. To put it another way, the airbag 24 in the inflated position may be between the beltline 38 and the floor 44.

The airbag 24 in the inflated position includes a front panel 58 and a rear panel 60. The front panel 58 and the rear panel 60 are relative to the housing 54. To put it another way, the rear panel 60 may be between the housing 54 and the front panel 58. The front panel 58 may be spaced from the rear panel 60, e.g., defining a chamber 62 therebetween. The front panel 58 and rear panel 60 may be fixed to each other, e.g., via stitching, adhesive, friction welding, etc. The front panel 58 and the rear panel 60 may be monolithic, i.e., made of a same sheet of material. Alternatively, the front panel 58 and the rear panel 60 may be multiple sheets of material The airbag 24 in the inflated position has the first portion 26, the second portion 28, and a third portion 64. The first portion 26 is between the second portion 28 and the third portion 64. In the inflated position, the airbag 24 may be U-shaped.

The first portion 26 may restrict movement of an occupant of the vehicle 22 along the vehicle-longitudinal axis A1. The first portion 26 may extend along the cross-vehicle axis A2, e.g., between the first portion 26 and the second portion 28. The first portion 26 has a first length L1. The first length L1 may be between the first corner 30 and a second corner 66, e.g., along the cross-vehicle axis A2.

The second portion 28 and the third portion 64 may restrict movement of an occupant of the vehicle 22 along the cross-vehicle axis A2. The second portion 28 and the third portion 64 extend transversely from the first portion 26. For example, the second portion 28 and the third portion 64 in the inflated position may extend along the vehicle-longitudinal axis A1. The second portion 28 and the third portion 64 may extend from the first portion 26 toward the seat 42. The second portion 28 and the third portion 64 may each extend to a distal end 72.

The second portion 28 and the third portion 64 may each have a second length L2. The second length L2 may be between the first corner 30 and the distal end 72 of the second portion 28 and between the second corner 66 and the distal end 72 of the third portion 64, e.g., along the vehicle-longitudinal axis A1. The second length L2 may be less than the first length L1.

The first corner 30 is between the first portion 26 and the second portion 28. The second corner 66 is between the first portion 26 and the third portion 64. The first corner 30 and the second corner 66 may be elongated along a height of the airbag 24 in the inflated positions, e.g., between a top 68 and a bottom 70 of the airbag 24 in the inflated position. The corners 30, 66 may arcuately transition the first portion 26 to the second portion 28 and the first portion 26 to the third portion 64, e.g., due to the flexible nature of material of the airbag 24. The corners 30, 66 may be at the front panel 58.

Figure 4:
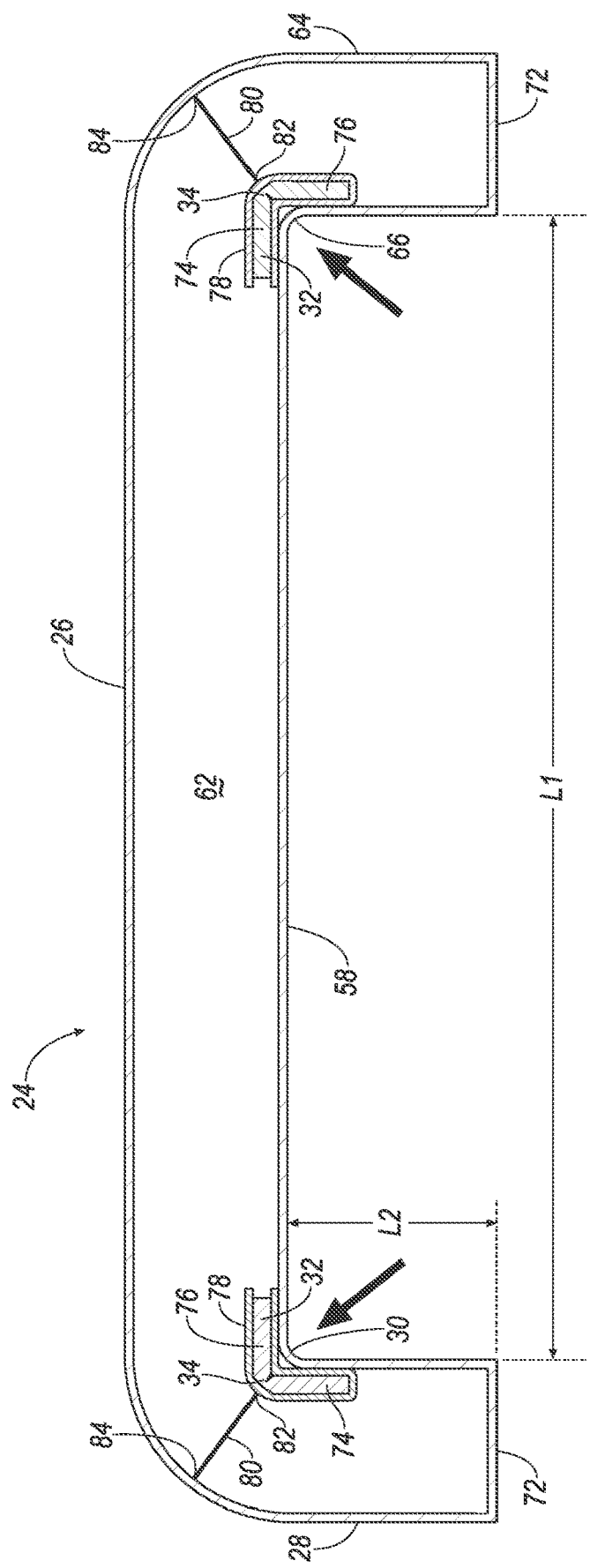
FIG. 4 is a cross section of the airbag in the inflated position.
Figure 5:
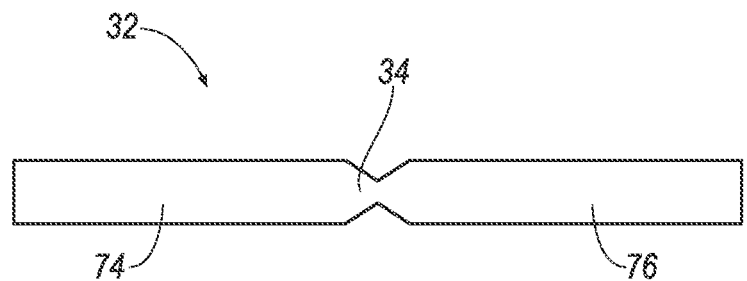
FIG. 5 is a top view of a stay of the airbag.
Figure 6:
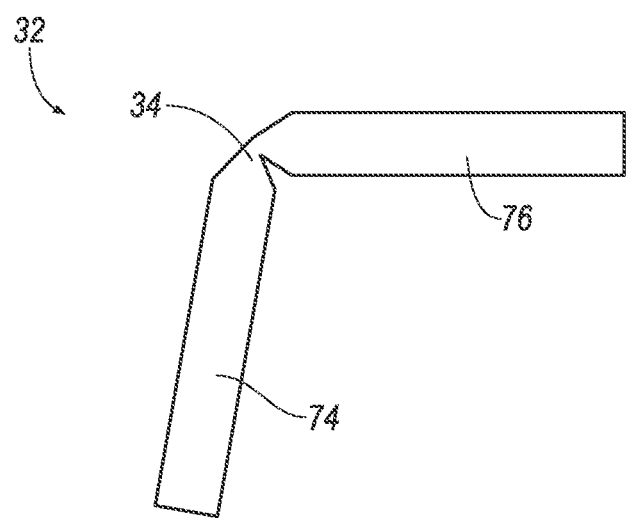
FIG. 6 is a top view of the stay in a bent position.

The stay 32 may include a first portion 74 and a second portion 76. The bendable portion 34 may be between the first portion 74 and the second portion 76. The stay 32 is bendable about the bendable portion 34 from an extended position to a bent position, e.g., when the airbag 24 inflates to the inflated position. The first portion 74 and the second portion 76 may be parallel in the extended position, as shown in FIG. 5. The first portion 74 may extend transversely from the bendable portion 34 relative to the second portion 76 in the bent position, as shown in FIGS. 4 and 6. The stay 32 may be plastic or any other suitable material. The stay 32 may be a different material than the airbag 24.

The stay 32 is designed to move from the extended position to the bent position, e.g., upon contact from an occupant of the vehicle 22 and/or from forces associated with inflation of the airbag 24. For example, the bendable portion 34 may be flexible relative to the first portion 74 and the second portion 76. In other words, when force is exerted on the stay 32, e.g., upon contact from an occupant of the vehicle 22, the bendable portion 34 bends prior to any bending, if at all, of the first portion 74 and second portion 76. The bendable portion 34 bends, and does not completely break, as the bendable portion 34 moves from the extended position to the bent position. The first portion 74 and the second portion 76 may remain undeformed as the bendable portion 34 moves to the bent position. As an example, the stay 32 may be notched at the bendable portion 34 to cause the bendable portion 34 to be flexible relative to the first portion 74 and the second portion 76. To put it another way, a cross sectional area of the stay 32 at the bendable portion 34 may be less than a cross sectional area of the stay 32 at the first portion 74 and the second portion 76.

The stay 32 is fixed to the airbag 24. The stay 32 may be supported by the front panel 58. For example, the stay 32 may be fixed via stitching, adhesive, sonic welding, etc. As another example, the front panel 58 of the airbag 24 may include a sleeve 78, and the stay 32 may be in the sleeve 78. The bendable portion 34 is at the first corner 30. The stay 32 extends from the bendable portion 34 along the first portion 26 and the second portion 28 of the airbag 24 in the inflated position. For example, the first portion 74 of the stay 32 may extend along the first portion 26 of the airbag 24 in the inflated position, and the second portion 76 of the stay 32 may extend along the second portion 28 of the airbag 24 in the inflated position.

The stay 32 is rigid relative to the airbag 24. For example, the airbag 24 may have a flexural strength, e.g., the front panel 58 proximate the first corner 30, that is less than the flexural strength of the first portion 74 and the second portion 76 of the stay 32.

The airbag assembly 20 may include one or more additional stays 32. For example, one stay 32 may be fixed to the airbag 24 with the bendable portion 34 at the second corner 66. Such stay 32 may extend from the bendable portion 34 along the first portion 26 and the third portion 64 in the inflated position. To put it another way, the stays 32 may be spaced from each other along the vehicle-longitudinal axis A1 and supported along the different corners 30, 66. As another example, one stay 32 may be spaced from another stay 32, both of such stays 32 supported by the airbag 24 at the first corner 30. To put it another way, the stays 32 may be spaced from each other and supported along the same corner 30, 66.

Figure 3:
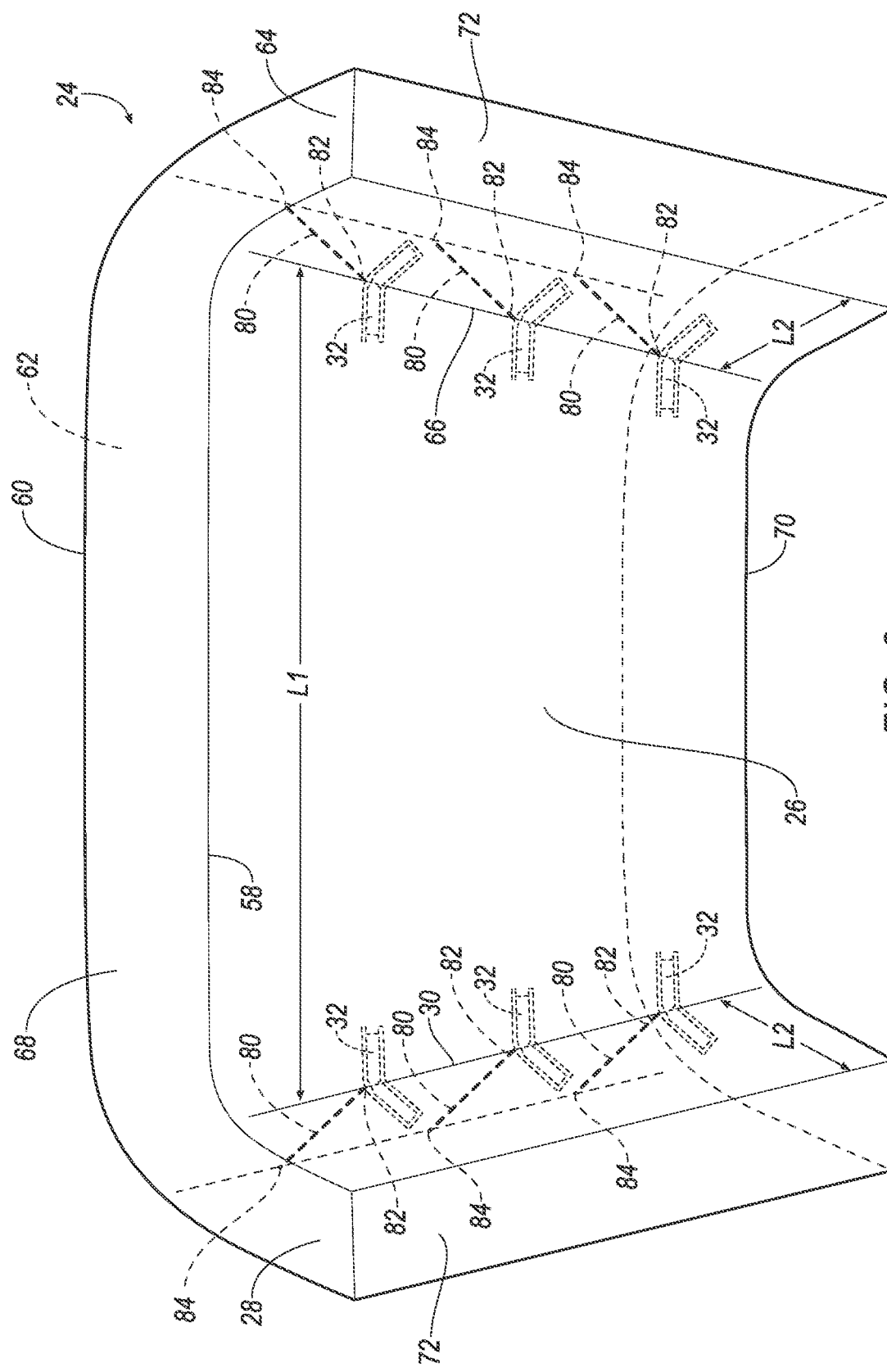
FIG. 3 is a perspective view of the airbag in the inflated position.

The airbag assembly 20 may include one or more tethers 80, shown in FIGS. 3 and 4. The tethers 80 help to define the corners 30, 66. Each tether 80 may include a first end 82 and a second end 84 spaced from the first end 82. The tethers 80 may be in the chamber 62, e.g., between the front panel 58 and the rear panel 60. The tethers 80 may be fixed to the front panel 58 at the corners 30, 66, e.g., the first ends 82 may be fixed via stitching, adhesive, friction welding, etc. The tethers 80 may extend to the rear panel 60. For example, the second ends 84 of the tethers 80 may be fixed to the rear panel 60, e.g., via stitching, adhesive, friction welding, etc.

The inflator 56, shown in FIG. 7, provides inflation medium to inflate the airbag 24 from the uninflated position to the inflated position. The inflator 56 may be in fluid communication with the airbag 24, e.g., directly, through various piping, etc. The inflator 56 may be, for example, a pyrotechnic inflator that uses a chemical reaction to drive inflation medium to the airbag 24. The inflator 56 may be of any suitable type, for example, a cold-gas inflator. The inflator 56 may be supported by the housing 54, the instrument panel 36, or by any other suitable location of the vehicle 22. One or more inflators 56 may be used to inflate the airbag 24.

The vehicle 22 may include at least one impact sensor 86 for sensing impact of the vehicle 22, and a computer 88 in communication with the impact sensor 86 and the inflator 56, shown in FIG. 7. The computer 88 may activate the inflator 56, e.g., to provide an impulse to a pyrotechnic charge of the inflator 56 when the impact sensor 86 senses an impact of the vehicle 22. Alternatively or additionally to sensing impact, the impact sensor 86 may be configured to sense impact prior to impact, i.e., pre-impact sensing.

The impact sensor 86 may be in communication with the computer 88. The impact sensor 86 is configured to detect an impact to the vehicle 22. The impact sensor 86 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 86 may be located at numerous points in or on the vehicle 22.

The computer 88 and the impact sensor 86 may be connected to a communication bus 90, such as a controller area network (CAN) bus, of the vehicle 22. The computer 88 may use information from the communication bus 90 to control the activation of the inflator 56. The inflator 56 may be connected directly to the computer 88, as shown in FIG. 7, or the inflator 56 may be connected via the communication bus 90.

The computer 88 may be a microprocessor-based computer 88 implemented via circuits, chips, or other electronic components. For example, the computer 88 may include a processor, a memory, etc. The memory of the computer 88 may include memory for storing programming instructions executable by the processor as well as for electronically storing data and/or databases.

The computer 88 may store instructions executable by the processor to actuate the airbag 24 in response to detecting a vehicle impact. For example, upon detecting a vehicle impact based on information from the impact sensor 86 the computer 88 may instruct the inflator 56 to inflate the airbag 24.

In operation, the airbag 24 is in the uninflated position under normal operating conditions of the vehicle 22. In the event of an impact, the impact sensor 86 may detect the impact and transmit a signal through the communication bus 90 to the computer 88. The computer 88 may transmit a signal to the inflator 56. Upon receiving the signal, the inflator 56 may discharge and inflate the airbag 24 with inflation medium from the uninflated position to the inflated position. Inflation of the airbag 24 generates forces in the airbag 24.

During the impact, momentum of the occupant seated in the seat 42 may cause the occupant, e.g., legs and knees of the occupant, to move along the vehicle-longitudinal axis A1 and the cross-vehicle axis A2 toward the airbag 24 in the inflated position. Such movement may cause the occupant to contact the airbag 24, e.g., to contact the stays 32, the first portion 26, second portion 28 and/or third portion 64 of the airbag 24.

The forces generated in the airbag 24 and/or the contact of the occupant with the airbag 24 may create bending stress the stays 32. The bending stress causes the stays 32 to bend at the bendable portions 34 while remaining substantially unbent along the first portion 74 and the second portions 76 of the stays 32. The bent stays 32 shape the airbag 24 in the inflated position into the U-shape shown in FIGS. 2-4.

The adjectives "first" and "second" are used throughout this document as identifiers and are not intended to signify importance or order.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   an airbag inflatable to an inflated position;
   the airbag in the inflated position having a first portion, a second portion extending transversely from the first portion, and a corner therebetween; and
   a stay fixed to and rigid relative to the airbag, the stay having a bendable portion at the corner and extending from the bendable portion along the first portion and the second portion when the airbag is in the inflated position.

2. The assembly of claim 1, wherein the airbag in the inflated position includes a front panel and a rear panel spaced from the front panel, the stay supported by the front panel.

3. The assembly of claim 1, wherein the stay is bendable about the bendable portion from an extended position to a bent position when the airbag inflates to the inflated position.

4. The assembly of claim 1, wherein the stay is notched at the bendable portion.

5. The assembly of claim 1, wherein the stay includes a first portion and a second portion, and the bendable portion is between the first and second portion of the stay, the bendable portion being flexible relative to the first and second portions of the stay.

6. The assembly of claim 1, wherein the stay is plastic.

7. The assembly of claim 1, wherein the airbag includes a third portion extending transversely from the first portion of the airbag and a second corner therebetween, and further comprising a second stay fixed to and rigid relative to the airbag, the second stay having a bendable portion at the second corner and extending from the bendable portion along the first portion and third portion of the airbag in the inflated position.

8. The assembly of claim 1, further comprising a second stay spaced from the stay and supported by the airbag at the corner.

9. The assembly of claim 1, further comprising a tether, wherein the airbag in the inflated position defines a chamber and the tether is in the chamber.

10. The assembly of claim 1, further comprising a tether, wherein the airbag in the inflated position includes a front panel and a rear panel spaced from the front panel, the tether fixed to the front panel at the corner and extending to the rear panel.

11. The assembly of claim 1, wherein the airbag is a first material, and the stay is a second material that is different than the first material.

12. The assembly of claim 1, wherein the first portion of the airbag has a first length, and the second portion of the airbag has a second length that is less than the first length.

13. A vehicle comprising:
    a seat;
    an airbag positioned in front of the seat and inflatable to an inflated position;
    the airbag in the inflated position having a first portion, a second portion extending transversely from the first portion, and a corner therebetween; and
    a stay fixed to and rigid relative to the airbag, the stay having a bendable portion at the corner and extending from the bendable portion along the first portion and the second portion when the airbag is in the inflated position.

14. The vehicle of claim 13, further comprising an instrument panel and a floor, wherein the airbag in the inflated position is between the instrument panel and the floor.

15. The vehicle of claim 14, wherein the instrument panel includes a steering column, and the airbag in the inflated position is between the steering column and the floor.

16. The vehicle of claim 13, wherein the first portion of the airbag extends along a cross-vehicle axis and the second portion of the airbag extends along a vehicle-longitudinal axis in the inflated position.

17. The vehicle of claim 13, wherein the stay is designed to move from an extended position to a bent position upon contact from an occupant of the vehicle.

18. The vehicle of claim 13, wherein the airbag in the inflated position is below a beltline.

19. The vehicle of claim 13, further comprising a tether, wherein the airbag in the inflated position defines a chamber and the tether is in the chamber.

20. The vehicle of claim 13, further comprising a tether, wherein the airbag in the inflated position includes a front panel and a rear panel spaced from the front panel, the tether fixed to the front panel at the corner and extending to the rear panel.

* * * * *